United States Patent [19]
McGroary et al.

[11] Patent Number: 5,128,681
[45] Date of Patent: Jul. 7, 1992

[54] MULTI-PULSE PULSE COMPRESSION RADAR SYSTEM

[75] Inventors: Francis X. McGroary, Oak Ridge, N.J.; Kevin Lindell, Trumbull; Marshall Greenspan, Fairfield, both of Conn.

[73] Assignee: United Technologies Corporation, Hartford, Conn.

[21] Appl. No.: 722,418

[22] Filed: Jun. 27, 1991

[51] Int. Cl.$^5$ ............................................. G01S 13/08
[52] U.S. Cl. ...................................... 342/132; 342/201
[58] Field of Search ..................... 342/112, 132, 201

[56] References Cited

U.S. PATENT DOCUMENTS

| | | | |
|---|---|---|---|
| 4,309,703 | 1/1982 | Blahut | 342/132 |
| 4,739,186 | 4/1988 | Crookshanks | 342/201 X |
| 4,983,979 | 1/1991 | McKenzie | 342/201 X |

Primary Examiner—Mark Hellner
Attorney, Agent, or Firm—Donald W. Muirhead

[57] ABSTRACT

A multi-pulse pulse compression radar system transmits two or more radar pulses having different frequency components having a time delay therebetween. A signal conditioning stage time and phase aligns the received signals and provides a composite radar signal having time and phase continuity throughout.

11 Claims, 2 Drawing Sheets

MULTI-PULSE PULSE COMPRESSION RADAR SYSTEM

DESCRIPTION

1. Technical Field

This invention relates to the field of pulse compression radar systems.

2. Background Art

A simple pulsed radar system determines the range of a target by measuring the time it takes a radar signal to propagate to the target and return. For a pulse having a duration time of t and a round trip time of T, the range of the target is between $c \times T/2$ and $c \times (T+t)/2$, where c is the propagation speed of the radar signal. A relatively short pulse duration improves the range resolution of the system (i.e. the distinguishable distance between two separate targets) by causing $c \times (T+t)/2$ (the maximum distance) to approach $c \times T/2$ (the minimum distance). However, decreasing the pulse duration decreases the average system output power, thereby decreasing the signal to noise ratio and increasing the incidence of false returns.

A pulse compression radar system overcomes limitations of a simple pulsed radar system by transmitting a pulse having a frequency which varies linearly with time and then compressing the return pulse with a filter that delays the signal an amount of time that varies with the frequency of the signal. The transmitted pulse can be relatively long, thereby increasing the average output power to improve the signal to noise ratio, and the received pulse is compressed by the delay filter, thereby increasing the range resolution of the system. Increasing the range of frequencies in the transmitted pulse increases the amount of possible compression and hence increases the range resolution of the system. The design and implementation of a conventional pulse compression radar system is known to those skilled in the art. See, for example, Sinsky, *Radar Technology*, editor Eli Brookner, Artech House, Dedham, Ma., 1985, pp. 123–142.

However, the requirements for varying the frequency of the radar pulse is limited by the maximum instantaneous bandwidth of the radar transmitter and receiver (i.e. the range of the lowest to highest frequencies which can be transmitted in a single pulse). The cost of a pulse compression radar system increases as the instantaneous bandwidth of the transmitter and receiver are increased.

DISCLOSURE OF INVENTION

Objects of the invention include a pulse compression radar system having improved range resolution.

According to the present invention, a multi-pulse pulse compression radar system time and phase aligns received radar signals to provide a single composite signal having time and phase continuity throughout.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
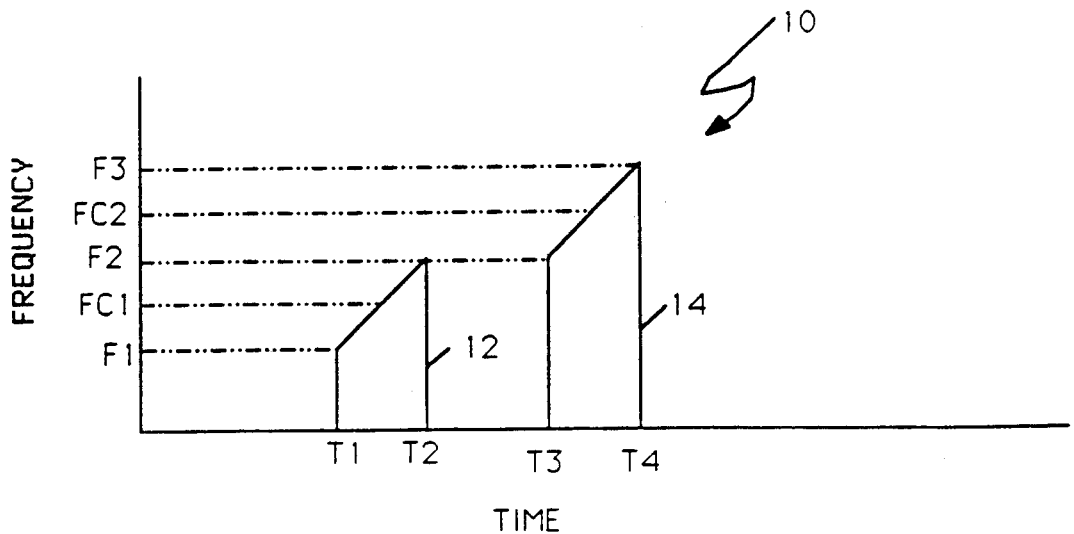
FIG. 1 is a graph illustrating the frequency of a pair of transmitted radar pulses as a function of time.

Referring to FIG. 1, a graph 10 has a vertical axis which corresponds to frequency and a horizontal axis which corresponds to time. The graph 10 illustrates a first pulse 12 and a second pulse 14 transmitted by a pulse compression radar system. Transmission of the first pulse 12 begins at time T1 and ends at time T2. Transmission of the second pulse 14 begins at time T3 and ends at time T4. Between the times T2 and T3, there is no pulse transmission. The first pulse 12 has a starting frequency F1 at time T1 and an ending frequency F2 at time T2. The second pulse 14 has a starting frequency F2 at time T3 and an ending frequency F3 at time T4. Note that the ending frequency of the first pulse 12 equals the starting frequency of the second pulse 14. The first pulse 12 has a carrier frequency FC1 associated therewith which equals $(F1+F2)/2$. Similarly, the second pulse 14 has a carrier frequency FC2 associated therewith equal to $(F2+F3)/2$. The specific values chosen for F1, F2, F3, T1, T2, T3, and T4 depend upon a variety of functional factors obvious to one skilled in the art.

Figure 2:
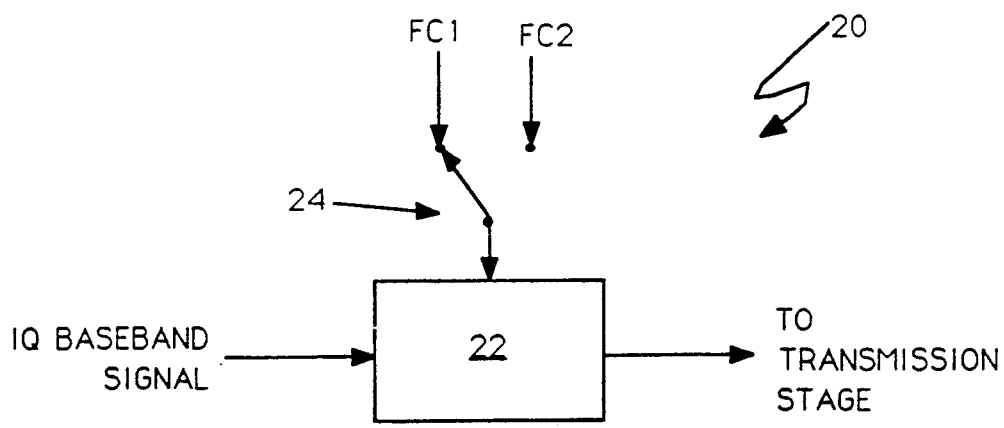
FIG. 2 is a schematic diagram of a pulse generation stage for a pulse compression radar system.

Referring to FIG. 2, a pulse generation stage 20 for a pulse compression radar system, having provision for transmitting the pulses 12, 14, is comprised of a modulator 22 and a switch 24. The modulator 22 is provided with an IQ baseband signal having a frequency which varies linearly with time at the same rate that frequency varies linearly with time for the pulses 12, 14. The switch 24 provides to the modulator 22 either a carrier signal having a frequency of FC1 or a carrier signal having a frequency of FC2, depending upon the position of the switch 24. The modulator 22 up-converts the IQ signal into either the first pulse 12 or the second pulse 14 depending upon whether the switch is providing FC1 or FC2, respectively, to the modulator 22. The output of the modulator 22 is provided to a transmission stage of the pulse compression radar system, the implementation of which is known to those skilled in the art. The pulse generation stage 20 and control functions therefor are implemented by means obvious to one skilled in the art using a combination of analog hardware, digital hardware, a microprocessor, and microprocessor software.

Figure 3:
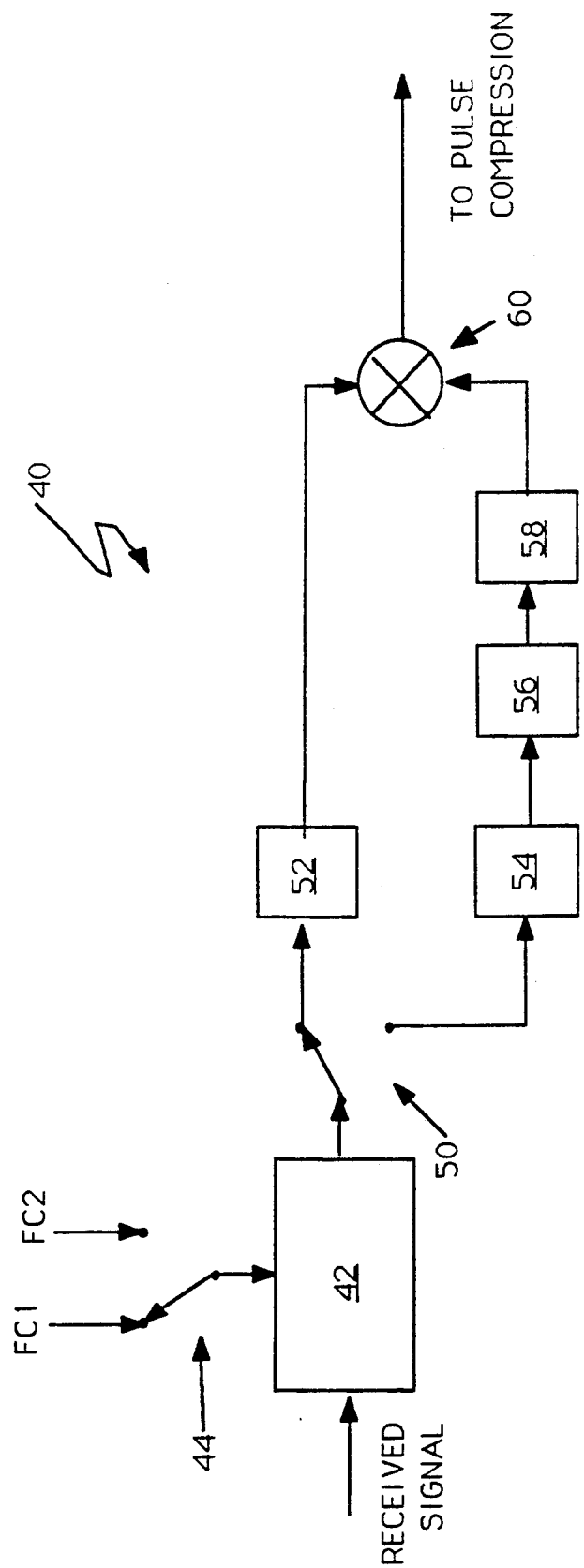
FIG. 3 is a schematic diagram of a signal conditioning stage for a pulse compression radar system.

Referring to FIG. 3, a signal conditioning stage 40 for a pulse compression radar system is provided with a received signal, which is a radar signal which has been transmitted by the system, bounced off a target, and received by a receiving antenna. The received signal is either due to the transmission of the first pulse 12 or due to the transmission of the second pulse 14. Note that the second pulse 14 can be transmitted before the signal due to the first pulse 12 has been received if the receiver can discriminate between signals due to the different pulses 12, 14. Otherwise, the second pulse 14 is transmitted after the first pulse 12 is received. The signal conditioning stage 40 processes the received signals to provide a single composite signal at the output of the stage 40. The nature of the composite signal is described in more detail hereinafter. The signal conditioning stage 40 and control functions therefor are implemented by means obvious to one skilled in the art using a combination of analog hardware, digital hardware, a microprocessor, and microprocessor software.

The received signal is initially provided as an input to an IQ demodulator 42, which is also provided with either the FC1 carrier signal or the FC2 carrier signal, depending on the state of a switch 44. For receipt of the first pulse 12, the switch 44 is set to provide FC1 to the demodulator 42, which down-converts the received signal by FC1. Similarly, for receipt of the second pulse 14, the switch 44 is set to provide FC2 to the demodulator 42, which down-converts the received signal by FC2. The IQ demodulator 42 uses analog to digital converter means to transform the down-converted signal into a digital signal having a plurality of real and imaginary components that are a function of time. For any time tn, there exists two values for a signal, a first value indicative of the value of the real component of the signal and a second value indicative of the value of the imaginary component of the signal. The absolute magnitude of the signal at any particular time is the square root of the sum of the squares of the value of the real component and the imaginary component. The phase of the signal at any particular time is the arctangent of the value of the imaginary component divided by the value of the real component. A description of IQ demodulation can be found in Lewis, *Aspects of Radar Signal Processing*, Artech House, Dedham, Ma., 1986 pp. 4-5. The digital values for the signal can be stored in a digital array in memory having indices corresponding to time and, for each index, having an element which corresponds to the real component and having an element which corresponds to the imaginary component. The digital sampling rate depends on a variety of functional factors known to those skilled in the art.

The time domain digital output of the demodulator 42 is provided to a switch 50, which, for receipt of the first pulse 12, provides the output of the demodulator 42 to a signal storage 52. The signal storage 52 is implemented using digital RAM by means known to those skilled in the art. For receipt of the second pulse 14, the switch 50 provides the output of the demodulator 42 to a time aligner 54, which time aligns the beginning of the signal from the second pulse 14 to coincide with the end of the signal from the first pulse 12. The adjustment can be performed by shifting the values for the signal ahead in an array (i.e. to higher indices) by an amount indicative of the duration of the signal from the first pulse 12. The time aligner 54 can be implemented using microprocessor software by means known to those skilled in the art.

The output of the time aligner 54 is provided to a phase aligner 56, which adjusts the phase of the signal to compensate for phase discrepancies which occur because the round trip time delay, T, causes a signal phase delay of $2\pi \times FC1 \times T$ if FC1 is selected as the phase reference or $2\pi \times FC2 \times T$ if FC2 is selected as the phase reference. The phase adjustment can be performed by multiplying the real and imaginary components of the signal by $e^{-j2\pi(FC2-FC1)T+\phi}$, where e is the natural logarithm, T is the amount of elapsed time between transmission and receipt of the second pulse 14 (i.e. the round trip time of the second pulse 14), and $\phi$ is a constant equal to the phase difference between the end of the first pulse 12 and the beginning of the second pulse 14, which can be determined by examining the phase difference at the output of the demodulator 42 produced by a relatively close target (i.e. a target which allows T to approach zero). The phase aligner 56 can be implemented using microprocessor software by means known to those skilled in the art.

The output of the phase aligner 56 is provided to a frequency aligner 58, which upshifts the frequency of the signal by an amount equal to FC2−FC1. This can be performed by first converting the signal to a representation in the frequency domain (using an FFT). The signal thus converted is stored in a memory array having indices which correspond to frequencies and elements which correspond to the real and imaginary values of the signal at the index frequency. The elements in the array are shifted ahead (i.e. moved to higher indices) an amount indicative of the quantity FC2−FC1. The frequency aligner 58 restores the original frequency relationship between the pulses 12, 14 (i.e. the starting frequency of the second pulse 14 being equal to the ending frequency of the first pulse 12) which was lost because the received signals from both pulses 12, 14 are demodulated to the same frequency by the demodulator 42. The frequency aligner 58 can be implemented using microprocessor software by means known to those skilled in the art.

The output from the signal storage 52 and the output from the frequency aligner 58 are provided to a summer 60, which adds the two signals together to provide the composite radar signal. Prior to adding the signals, the signal from the signal storage 52 is converted into the frequency domain (using an FFT) or the signal from the frequency aligner 58 is converted into the time domain (using an inverse FFT). The signals are added by adding the memory arrays for each of the signals to form a new memory array indicative of the sum of the signals. The addition of two arrays to form a third array is known to those skilled in the art. The summer 60 can be implemented using microprocessor software by means known to those skilled in the art. Note that since the signal received from second pulse 14 has been time aligned and phase aligned so as to appear to have been contiguous with the signal received from the first pulse 12, the composite radar signal is a single signal having phase and time continuity throughout. The composite radar signal can then be provided to a pulse compression filter.

Although the invention has been shown using two pulses 12, 14, it will be appreciated by those skilled in the art that more than two pulses can be used so long as the received signal from each pulse is time and phase aligned as illustrated herein. It can also be appreciated by those skilled in the art that the frequency components of the pulses can overlap (i.e. the starting frequency of the second pulse can be less than the ending frequency of the first pulse) and that it may be desirable to do so in order to compensate for signal degradation due to hardware constraints. The rate of frequency change of the pulses does not have to be linear as shown herein. Furthermore, the constant $\phi$, which is present in the exponential portion of the term used by the phase aligner 56, can be eliminated if the beginning absolute phase of the second pulse 14 is made equal to the ending absolute phase of the first pulse 12, as seen at the output of the demodulator 42.

The invention may be practiced without demodulating the received signals, in which case the frequency aligner 58 would be unnecessary. Similarly, the invention may be practiced by demodulating the received signals to different values, so long as the signals are ultimately frequency aligned to restore the original frequency relationship between them. Even though the frequency aligner 58 has been shown as operating on the return signal from the second pulse 14, the invention may be practiced by frequency aligning the return signal from the first pulse 12, or by frequency aligning all the signals.

The invention may be practiced with the time aligner 54 switched in sequence with the phase aligner 56 (i.e. having the signal go through the phase aligner 56 and then through the time aligner 54). Even though the time aligner 54 and the phase aligner 56 are shown as operating in the time domain, it will be appreciated by those skilled in the art that either or both can operate in the frequency domain provided that a time domain input signal is converted to the frequency domain. Although the invention has been illustrated herein as microprocessor software operating upon digital signals, the invention can be implemented using a variety of alternatives obvious to one skilled in the art, including, but not limited to, combinations of digital hardware, analog circuitry, etc., the equivalence of which is demonstrated (in another field) in U.S. Pat. No. 4,294,162 entitled "Force Feel Actuator Fault Detection with Directional Threshold" (Fowler et. al.).

Although the invention has been shown and described with respect to exemplary embodiments thereof, it should be understood by those skilled in the art that various changes, omissions and additions may be made therein and thereto, without departing from the spirit and the scope of the invention.

What is claimed is:

1. A pulse compression radar system, comprising:
   transmission means, for providing a number of radar pulses wherein the frequency of each of said pulses varies as a function of time and wherein at least one of said pulses contains frequency components not present in other ones of said pulses;
   receiving means, for receiving return signals corresponding to said radar pulses striking a target and returning;
   signal conditioning means, for generating a composite radar signal by phase aligning and time aligning said return signals in order to provide phase and time continuity between the end of one of said signals and the beginning of an immediately subsequent one of said signals.

2. A pulse compression radar system, according to claim 1, wherein said received signals are represented as digital values.

3. A pulse compression radar system, according to claim 2, wherein said signal conditioning means is implemented using microprocessor software.

4. A pulse compression radar system, according to claim 1, wherein said number of said radar pulses equals two.

5. A pulse compression radar system, according to claim 1, wherein the frequency of said radar pulses varies linearly with time.

6. A pulse compression radar system, according to claim 1, wherein the ending frequency of each of said pulses equals the starting frequency of other ones of said pulses.

7. A pulse compression radar system, according to claim 3, wherein the ending frequency of each of said pulses equals the starting frequency of other ones of said pulses.

8. A pulse compression radar system, according to claim 4, wherein the ending frequency of each of said pulses equals the starting frequency of other ones of said pulses.

9. A pulse compression radar system, according to claim 5, wherein the ending frequency of each of said pulses equals the starting frequency of other ones of said pulses.

10. A method of generating a composite radar signal having time and phase continuity throughout in response to receipt of a plurality of received radar signals wherein the frequency of each of said received signals varies as a function of time and wherein at least one of said received signals contains frequency components not present in other ones of said received signals, said method comprising:
    time aligning said received signals to provide time continuity between the end of one of said received signals and the beginning of an immediately subsequent one of said received signals; and
    phase aligning said received signals to provide phase continuity between the end of one of said received signals and the beginning of an immediately subsequent one of said received signals.

11. A method of generating a composite radar signal having time and phase continuity throughout in response to receipt of a plurality of received radar signals wherein the frequency of each of said received signals varies as a function of time and wherein at least one of said received signals contains frequency components not present in other ones of said received signals, according to claim 10, said method further comprising:
    prior to said time aligning and phase aligning steps, the step of down converting said received signals by an amount equal to a carrier frequency of each of said received signals; and
    after said time aligning and phase aligning steps, the step of up converting one or more of said signals to restore the original frequency relationship between said signals.

* * * * *